Aug. 27, 1968  W. E. BENSON, JR  3,399,344
CAPACITOR TEST CELL, INCORPORATED IN A CONVEYOR BED FOR
CONVEYING LARGE BULKY HEAVY INDIVIDUAL PIECES, FOR THE
CAPACITIVE MEASUREMENT OF MOISTURE IN SAID PIECES
WHILE SUPPORTED ON SAID BED
Filed Feb. 19, 1965  2 Sheets-Sheet 1
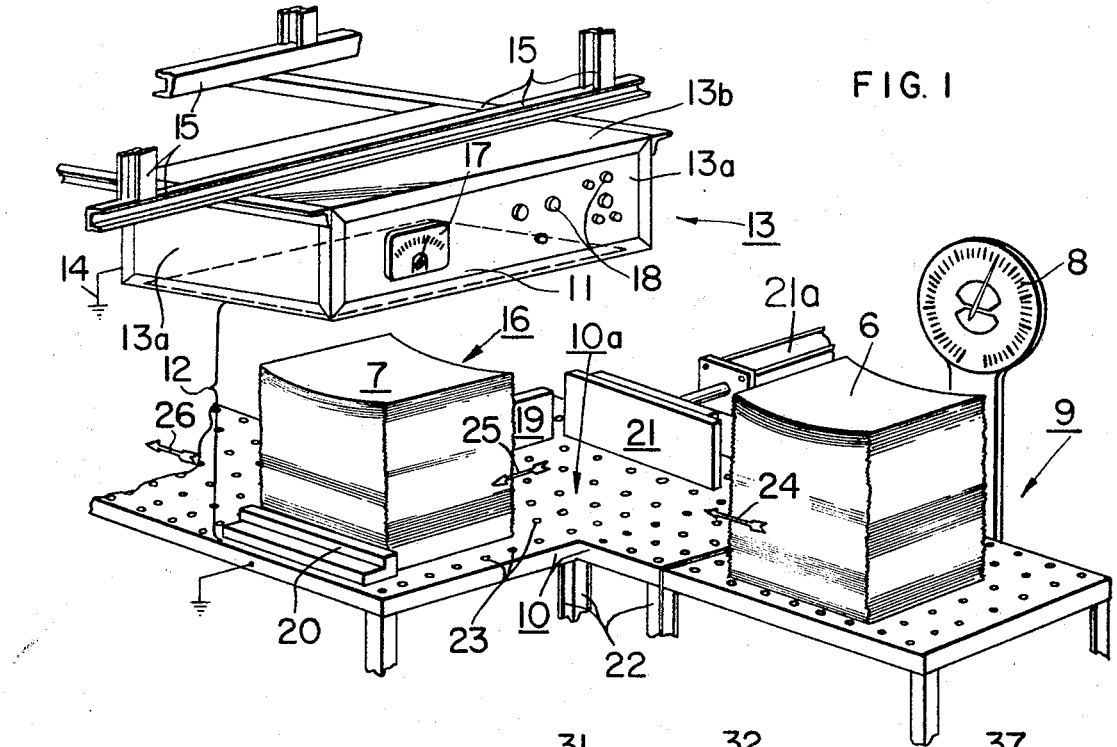
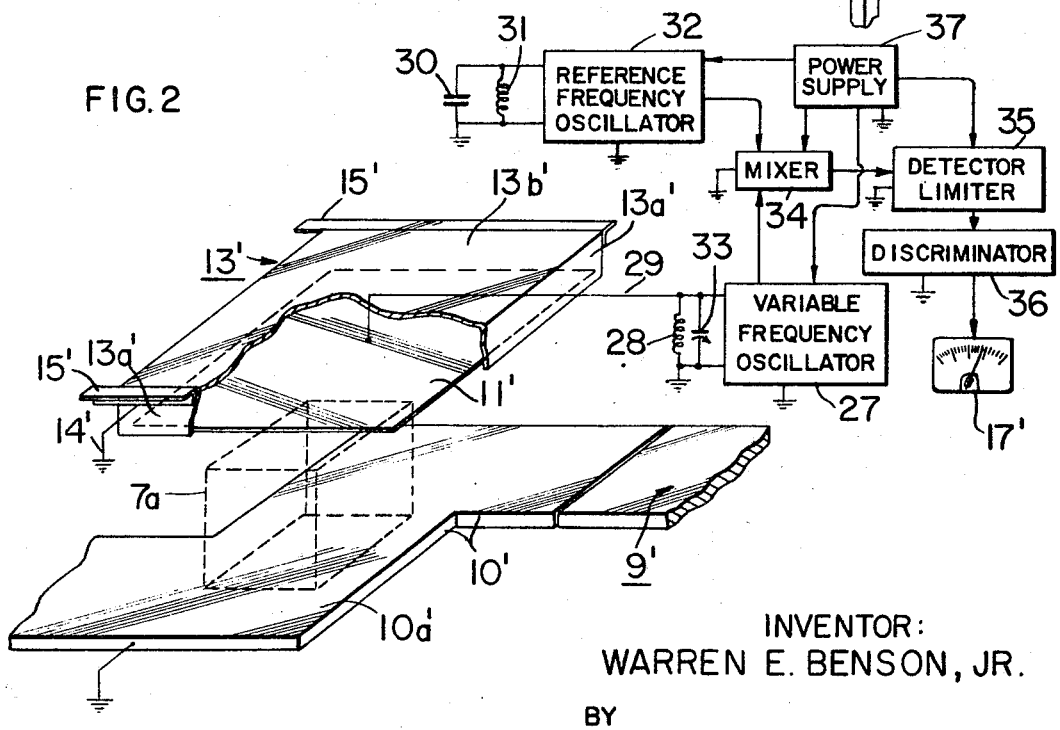
INVENTOR:
WARREN E. BENSON, JR.
BY
Dike, Thompson, Bronstein & Moose
ATTORNEYS

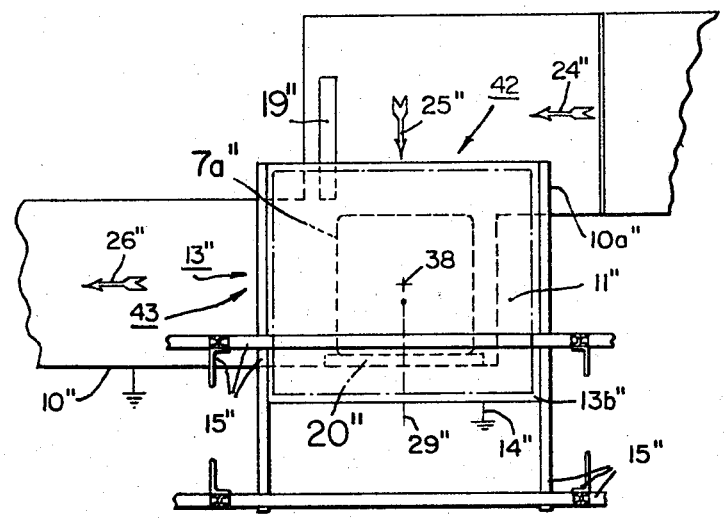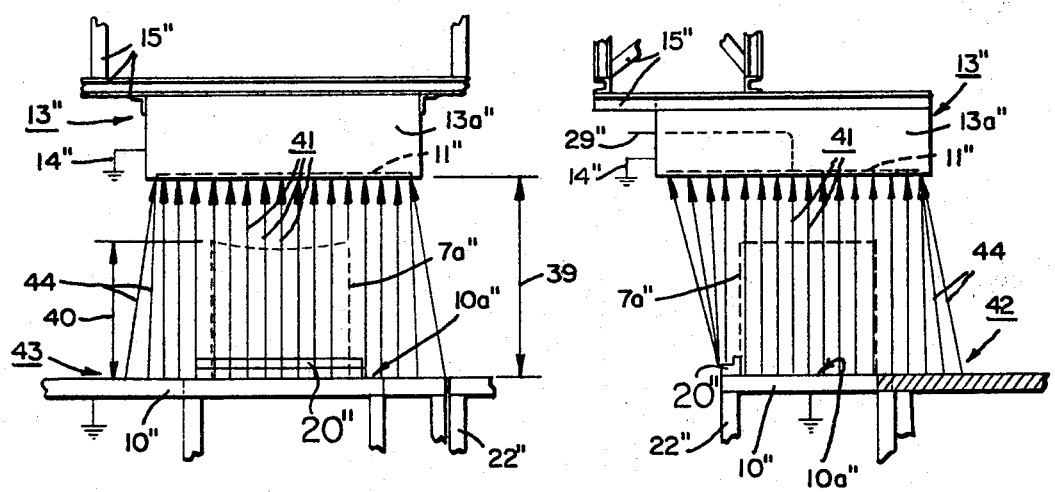

United States Patent Office 3,399,344
Patented Aug. 27, 1968

3,399,344
CAPACITOR TEST CELL, INCORPORATED IN A CONVEYOR BED FOR CONVEYING LARGE BULKY HEAVY INDIVIDUAL PIECES FOR THE CAPACITIVE MEASUREMENT OF MOISTURE IN SAID PIECES WHILE SUPPORTED ON SAID BED
Warren E. Benson, Jr., Needham, Mass., assignor, by mesne assignments, to Kingsbury Technology Inc., Norwood, Mass., a corporation of Delaware
Filed Feb. 19, 1965, Ser. No. 434,066
8 Claims. (Cl. 324—61)

ABSTRACT OF THE DISCLOSURE

A capacitor test cell for accurately measuring the moisture content of bulky, heavy, individual pieces, such as stacks or bales of wood pulp, to avoid the necessity of measuring small samples of the material in the piece, in which test cell a lower horizontal electrode constitutes part of a horizontal conveyor and weight supporting bed for transporting and supporting the pieces, which bed is grounded, so that a part of the grounded conveyor and supporting surface also functions as the lower grounded electrode of the cell, with the upper horizontal electrode, to which the alternating voltage is applied, being supported above that portion of the conveyor bed constituting the lower electrode so that the sides of the measurement space between the electrodes are unobstructed and so that the conveyor bed extends laterally in two directions beyond the measurement region between the two electrodes, whereby the pieces can be easily, accurately and uniformly moved on the conveyor bed into and out of measuring position within the measurement region between the electrodes by sliding them along the conveyor bed. The portions of the two electrodes which lie opposite to each other are of a size greater than the maximum horizontal dimension of the pieces and the conveyor bed is provided with an index member and guide of insulating material for the pieces to insure that each piece will be uniformly moved on the conveyor into proper position for measurement between the two electrodes. In essence the test cell is built into a conveyor bed for the pieces. Preferably, the upper electrode is surrounded by a conductive, grounded shield except for the lower surface thereof facing the conveyor bed.

---

The present invention relates to improvements in determining properties of substances in bulk form, such as the moisture content of stacked sheets of wood pulp, through measurement of capacitivities, i.e., their effects upon the capacity of an electrical capacitor, and, in one particular aspect, to novel and improved capacitor test cell apparatus of an open type wherein a single partly-shielded plate is suspended above grounded conveyor surfaces to develop a stable electric measurement field into which pulp stacks may readily be indexed on the conveyor and measured without undue disturbances by stray-field effects.

It is well known that dielectric constants of materials may be related to properties such as their moisture content, dimensions, and composition. Based upon this recognition, such properties may often be determined very conveniently through use of electronic detection devices associated with and responding to the capacitivities exhibited by capacitive test cells. By way of example, the swiftness and ease with which moisture content measurements may be made in this manner are in sharp contrast with the tedious, costly, and relatively crude practice involving the baking and weighing samples, as has long been routine in many industries. In the textile, chemical and foodstuffs industries, it is commonly required that moisture content be established with sufficient precision to insure not only that processing and storage characteristics meet certain rigorous standards but that, from an economic standpoint, the actual yields of the materials of interest, as distinguished from associated moisture, be within prescribed ranges.

When electronic moisture detection equipment is used for these purposes, the associated test cells should be rendered immune to error, insofar as possible, and this suggests that such cells should be relatively small and rigid and fully enclosed, to minimize dimensional variations and stray fields. However, the use of small cells necessitates resort to sampling of small quantities of bulk materials being investigated, with attendant likelihood of appreciable measurement error in the event the remainder of the bulk does not have characteristics identical with those of the selected sample. It frequently occurs that samples taken from the exterior of a large mass of material exhibits a moisture content significantly different from that elsewhere, and it is generally troublesome to cull an adequate number of portions of material from an adequate number of different positions within a large mass to yield a good statistical average. In other instances, such as that involving stacked sheets of wood pulp, practice of such thorough sampling would be virtually impossible. Delays involved in allowing moisture to distribute itself uniformly throughout a large mass can be intolerable in commercial processing operations.

In some cases it has been possible to measure properties of bulk materials by positioning them between a spaced pair of large-area vertically-disposed capacitor plates, taking precautions which insure that the electrostatic field is not disturbed by the mechanisms used to hold or transport the bulk materials. Equipment of this type tends to be cumbersome and to occupy large areas of floor space and to present broad-area visual obstructions; in addition, it requires massive and rugged framework to maintain a strict parallelism and precise spacing between the large vertical plates and to orient the non-metallic symmetrical mechanisms used to support and move the measured substances. According to the present teachings, however, difficulties associated both with sampling techniques and with prior bulk-measurement techniques are avoided through unique measurements involving only a single shielded capacitor plate, which is suspended horizontally above an open grounded conveyor. The improved test apparatus accommodates large bulks of material, such as stacks of wood pulp sheets, and is accurately responsive to moisture content of the entire batch undergoing evaluation, and yet is virtually as unobstructed and accessible as a simple open conveyor alone.

It is one of the objects of the present invention, therefore, to provide novel and improved measurement apparatus wherein properties of materials in bulk form are accurately evaluated while in situ on horizontal conveyor surfaces which cooperate with a superposed capacitor plate in developing a stable electrostatic test field.

Another object is to provide improved capacitivity-measurement cells of open construction which include conveyor surfaces as cell plate surfaces and which will readily accept large discrete quantities of substances for evaluation of properties such as moisture content.

A further object is to provide a unique single-plate capacitive test cell, for measurement of capacitivity of bulk quantities of materials, wherein a grounded open conveyor mechanism for the bulk quantities of material is itself in electrical circuit relationship with a spaced and partly-shielded capacitor plate and cooperates in producing an unobstructed and highly accessible cell test region which is substantially immune to deleterious effects of variable stray fields.

By way of a summary account of practice of this invention in one of its aspects, there is provided in an electronic moisture detection system a reference oscillator, the output frequency of which is regulated by the capacitance of a special form of detector, this capacitance being related to the dielectric characteristics of a large stack of wood pulp sheets (i.e., a "pulp bale") disposed within a predetermined measurement region in an electrostatic field developed by the detector. Each of the stacks undergoing evaluation is transported horizontally from a weighing site to a baling station upon a substantially flat-surfaced conveyor, and, at an intermediate position, is mechanically indexed into a predetermined measurement region wherein a high-frequency electrostatic flux field is developed by the detector. This field extends between the grounded conductive top surfaces of the conveyor and the lower surface of a substantially horizontal broad-area capacitor plate of the detector, the latter plate being partly shielded and being held securely from above at a fixed distance from the top of the conveyor. Access to the measurement region, from the side, is unobstructed, and the stacks may be moved to and through that region without interference from doors, shielding panels, or the like. Preferably, the assembly further includes automatic mechanical stop and indexing mechanisms for insuring that the stacks are properly oriented for measurement purposes.

The subject matter regarded as my invention is particularly pointed out and distinctly claimed in the concluding portion of this specification. However, both as to preferred structure and assembly, and further in relation to objects and advantages thereof, this invention may best be understood through reference to the following description taken in connection with the accompanying drawings, wherein:

FIGURE 1 portrays a conveyor and test cell arrangement for the improved electronic detection of moisture content of wood pulp stacks;

FIGURE 2 depicts a block-diagrammed moisture detection system in association with an open capacitivity-responsive cell wherein an electrostatic flux field is advantageously developed between an open conveyor and a superpositioned capacitor plate;

FIGURE 3 provides a pictorial view, from above, of an open conveyor and capacitivity-measurment arrangement generally like that in FIGURES 1 and 2;

FIGURE 4 is an end view of the arrangement appearing in FIGURE 3; and

FIGURE 5 is a side view of the arrangement appearing in FIGURE 3.

The embodying equipment illustrated in FIGURE 1 is of a design intended to accommodate stacks of wood pulp, such as those numbered 6 and 7, which are comprised of stacked sheets having a predetermined total weight. Commonly, each of the stacks may weigh about 500 pounds, with five of them making up one set of bales, and four of these sets being made up into a so-called "skid" which represents 10,000 pounds of pulp. Prior practice for determining the moisture content of each five tons of pulp has involved oven-drying (example: at temperatures of 260–300° F.) of five wood pulp sheets (each weighing about a pound) taken one from each stack, or bale, in one of the four sets in a skid. Average moisture content for the entire skid has been determined from the weight loss of these few samples. When it is recognized that significant moisture variations may occur as between any two sheets, then it is evident that the true average skid moisture content is often considerably different from that calculated by the five-sheet method. However, in the FIGURE 1 apparatus, each of the stacks or bales is evaluated in its entirety, electronically, without the aforesaid type of sampling, and without the delays and statistical uncertainties which characterize the prior technique. For these purposes, the stack weights are first individually established through reference to a common type of scale 8 at a weighing station 9, and, thereafter, each stack is transported along a horizontal conveyor 10 and indexed at a substantially centered position (that of stack 7) within a predetermined measurement region below a broad area flat conductive electrode or plate 11. The latter electrode is suspended above the substantially horizontal top surface 10a of the conveyor in a substantially parallel relationship to it and with a vertical spacing 12 which is in excess of the maximum expected heights of stacks which are to be processed.

Electrode 11 is electrically excited in a manner discussed later herein, and is electrically insulated (by conventional insulating material, not shown) from a closed rigid metal cabinet unit 13 of which it forms the bottom. The four sides 13a and top 13b of the cabinet are formed of conductive sheet metal, and are electrically grounded, at 14, to produce an electrostatic shield for electrode 11 in all directions except the downward direction, and the shielded unit 13 is in turn held sturdily in the intended orientation above the conveyor bed by overhead structural steel framework members 15. The entire area around the intervening measurement region 16 remains open and free of any impediments which could interfere with access to and handling of the stacks, or which could disturb the desired pattern of electrostatic flux lines extending between the grounded top surface 10a of the conveyor and the exposed lower surface of the plate 11.

Capacitivity measurements, which are directly related to moisture content of pulp stacks of predetermined weight, appear directly upon a moving-coil type of measuring instrument 17 mounted on the front panel of the cabinet, where other adjustment and indicating hardware, 18, for the enclosed electronic circuitry are also supported for convenient access and reference. Measurements are performed on a substantially instantaneous basis, while each stack is stationary within the measurement region 16 at a position to which it has been indexed by two stops 19 and 20 and a power-actuated ram 21. Preferably, the conveyor bed is itself stationary, and is stably mounted by framework elements 22, and low-friction movement of the stacks thereacross is facilitated by a film of air admitted below them by a plurality of minute valving balls 23 which are distributed uniformly across the upper surface of the conveyor bed. Valving balls 23 are recessed into the conveyor bed and, in a known manner, are pressurized with air from below, permitting air to escape and form a supporting film or layer when they are depressed by weight of the stacks sliding across them. This type of air-film support is not required during the measurements, but facilitates low-friction sliding of the stacks into and out of the measurement region. Accurate indexing of the stacks is promoted by the stops 19 and 20, both of which are of nonconductive material and thus do not materially distort the measurement field. In its movement in direction 24 from the weighing station 9, a pulp stack glides with air-film support toward the stop 19, and its travel is then changed to direction 25 by action of the ram member 21, shown actuated by a reciprocatable fluid-powered piston-cylinder unit 21a. Stop 20 halts lateral movement of the stack at the desired locus within the measurement region 16, and, after the capacitivity evaluation is completed, the stack may be pushed in direction 26 toward a baling station (not shown) in the pulp-processing system.

The same type of test apparatus is depicted in FIGURE 2, wherein the associated electronic circuitry is also represented, and the same reference characters, with distinguishing single-prime accents added, are there employed to designate elements serving the functions of those described in connection with the FIGURE 1 equipment. A measured sample, characterized by dashed linework 7a, affects the capacitivity exhibited between grounded conveyor surface 10a' and the partly-shielded electrode 11', this capacitivity being effective to control the frequency of a variable frequency oscillator 27. For the latter purpose, a frequency-controlling inductance 28 of the variable oscillator is on one side grounded in common with the conveyor and the shielding for electrode 11', and the horizontal electrode 11' is coupled to the ungrounded or "hot" side of that inductance via a connection 29. Counterparts of these frequency-controlling components are found in a parallelled reference capacitor 30 and inductance 31 which tune a reference frequency oscillator 32. Output frequencies of variable oscillator 27 are related to the dielectric constants of the measured sample 7a, while the output frequencies of reference oscillator 32 remain substantially fixed. To some extent, the former output frequencies may also be regulated, selectably, by adjustment of an auxiliary tuning capacitor 33, to establish predetermined frequency differences between the oscillator outputs. Combination of the two oscillator outputs, as by an adding mixer circuit 34, yields one component of further output signals which is substantially equal to the differences between oscillator frequencies and which is preferably within an audio frequency range. Detector-limiter 35 accomplishes a demodulation which results in a signal of frequencies substantially equal to the existing difference in oscillator frequencies, and amplitude irregularities are eliminated in a limiting operation, such that the output of this unit is caused to be in the form of pulses of uniform amplitude and of periodicities corresponding to differences in frequencies of the signals generated by the variable and reference oscillators. Discriminator 36, which is preferably of a non-resonant type, is excited by the pulse signal output of detector-limiter 35 and delivers current through instrument 17', preferably an ammeter, which is related to the aforesaid frequency differences. Preferably, the circuits and circuit elements which require energizing from a major power source are excited by a regulated power supply 37. If desired, full details of certain circuitry which may be employed in a measuring system such as that described may be perceived through reference to United States Patent No. 3,012,193, assigned to the same assignee as that of the present application. It will be recognized that a system of the foregoing character will yield output indications accurately related to the capacitivity of the test unit applied across inductance 28.

The apparatus viewed in FIGURES 3 through 6 corresponds to that illustrated in FIGURES 1 and 2 and the same reference characters, with distinguishing double-prime accents, are therefore employed to identify functionally-equivalent portions. The broad-area rectangular electrode 11" is seen to extend peripherally beyond the lateral extremities of the pulp stack 7a" and to be substantially centered at 38 with the center thereof; in turn, the grounded top surface 10a" of the conveyor 10" also extends beyond the lateral extremities of the stack when it is properly indexed and centered within the measurement region, although the horizontal top conveyor surface directly below the horizontal electrode 11" are of somewhat smaller area than that of the electrode. The vertical spacing 39 between the top conveyor surface 10a", which is disposed at about waist height in relation to nearby operators, and the parallel lower surface of broad-area electrode 11" is somewhat in excess of the maximum height 40 of the measured stacks. Electrostatic field flux lines 41 generated between electrode 11" and surface 10a" are substantially vertical and are advantageously distributed substantially uniformly throughout the measurement region in which the stacks are oriented while undergoing measurement. The continuous conveyor surfaces at the site 42 where stacks enter and at the site 43 where they leave the optimum measurement region also tend to promote fringing flux field lines, 44, which are not vertical and uniformly distributed; however, these field lines lie outside the centralized measurement region and do not adversely affect the capacitivity measurements when the stack is well centered within that region. All of the other field lines, extending between the electrode 11" and inner surfaces of the grounded cabinetry 13", remain stable and thus cannot disrupt the accurate responses to capacitivity of the measured bulk material. In the main, field flux lines tend to remain concentrated within the desired region where they may extend perpendicularly to and directly between the lower surface of electrode 11" and the top conveyor surface 10a", such that external influences at greater distances have negligible deleterious effect. The rapidly-and cyclically-reversing polarity of electrode 11" is slaved in relation to the ground potential of the conveyor surface 10a" and of the cabinetry 13", and, hence, the isolation from external influences, which are not likely to be at potentials other than the local ground potential, is maintained at an optimum level.

Those skilled in the art will appreciate that certain departures from the foregoing specific examples will lie within the purview of this invention. In particular, it should be evident that the illustrated conveyor may be wholly linear, for example, and that the air-film support for the evaluated bulk materials may instead be omitted or replaced by other provisions for facilitating transport without significantly altering the effective conveyor area, as witnessed by the single electrode, or the vertical spacing. And, the associated electronic circuitry, and indicator, recorder, or other output device, may of course be at a location remote from that of the shielded electrode, rather than housed within the same enclosure. Accordingly, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Apparatus responsive to capacitivity of substances in the form of bulky, heavy, individual pieces for measuring the moisture in said pieces and adapted to be coupled into an electrical measurement system, comprising a horizontal conveying and weight supporting bed for the horizontal transport and weight support of said pieces and having a horizontal conductive upper surface for supporting the weight of, and transporting, said pieces thereon, a portion of said upper surface also forming an electrode of a capacitor test cell, a horizontal broad-area conductive electrode constituting the other electrode of said test cell, means mounting said broad area electrode above and in vertically-spaced and electrically insulated relation to said portion of said upper conveyor surface to form a measurement region therebetween, while leaving unobstructed the areas surrounding said measurement region, means for maintaining the potential of said upper surface at a substantially fixed reference ground potential, a frequency controlling circuit in the measurement system, and means for applying to said broad area electrode from said frequency-controlling circuit potentials varying periodically in relation to said reference ground potential, whereby electrostatic field flux lines are concentrated in said measurement region and negligible field flux fringes variably toward nearby objects in the areas surrounding the measurement region, the vertical and horizontal dimensions of said measurement region being in excess of the maximum height and maximum horizontal cross-sectional areas, respectively, of said pieces, whereby said measurement region is of a size to receive said pieces, said upper conveyor surface extending laterally beyond said measurement region for transport of said pieces on said upper surface into and out of measuring position in said measurement region, said means for mounting said borad-area electrode comprising means grounded at a reference potential mounting said electrode from above in an electrically insulated relation thereto and in a substantially horizontal orientation, the portion of said conveyor bed underlying said broad area electrode comprising a test site, said conveyor bed extending from a first site removed from said test site to said test site and from said test site to a second site removed from said test site, whereby said pieces are adapted to be moved along said bed from said first site into said test site for testing and then from said test site to said second site.

2. Apparatus according to claim 1, further comprising conductive means in spaced relation to and shielding all surfaces of said broad-area electrode other than said lower surface thereof, said conductive meanns extending above the level of said lower surface and leaving unobstructed said areas surrounding the measurement region, and means maintaining said conductive means at said reference ground potential.

3. Apparatus according to claim 2, further comprising insulating means mounted on said supporting bed in position to uniformly index each of the pieces into a predetermined measuring position and orientation within the measurement region.

4. Apparatus according to claim 1, wherein said surfaces forming said measurement region are planar and the area of said lower surface of said broad area electrode is in excess of the area of said upper surface lying directly below said lower surface, said pieces comprising end products of a processing system.

5. Apparatus according to claim 1, wherein said means mounting said electrode includes a conductive enclosure shielding said electrode on all sides while leaving the lower surface thereof exposed in a direction downwardly toward said upper surface of said conveyor, and a rigid structural frame-work disposed above the level of said lower surface and suspending said shielding enclosure.

6. Apparatus according to claim 5, wherein said upper surface is at substantially waist height in relation to operators of said apparatus, and wherein said conveyor is stationary and includes means for flowing pressurized air between said upper surface and said pieces supported thereon to develop a film of air between said upper surface and said pieces and thereby promote low-friction movement of the substances across said conveyor.

7. Apparatus according to claim 5, wherein said broad area electrode is substantially rectangular, wherein said conveyor surface directly underlying said broad area electrode is of lesser area than said electrode, said conveyor surface extending laterally in at least two different directions beyond the region underlying said electrode to provide said first and second sites, each of said lateral extensions being large enough to support at least one of said pieces, insulating stop means mounted on said conveyor in position within said region to halt movement of said pieces in one direction through said region, and power-actuated ram means disposed outside said region but movable into said region for moving said pieces along the conveyor surface and onto the portion thereof within said region into engagement with said stop means.

8. Apparatus according to claim 7, further comprising guide means of insulating material mounted on said conveyor in position to guide movement of said pieces into said region by said ram means, said stop means and guide means being proportioned to permit unobstructed movement of said pieces out of said region on said conveyor surface.

References Cited

UNITED STATES PATENTS

| | | | |
|---|---|---|---|
| 1,708,073 | 4/1929 | Allen | 324—61 |
| 1,822,604 | 9/1931 | Simons et al. | 324—61 XR |
| 1,824,745 | 9/1931 | Allen | 324—61 |
| 2,277,953 | 3/1942 | Christensen | 324—61 |
| 2,718,620 | 9/1955 | Howe | 324—61 |
| 2,782,367 | 2/1957 | Dallas | 324—61 |
| 2,849,675 | 8/1958 | Hall et al. | 324—61 |
| 3,019,897 | 2/1962 | Barber et al. | 324—61 XR |
| 3,028,548 | 3/1962 | Breen | 324—61 |
| 3,221,248 | 11/1965 | Batteau et al. | 324—61 XR |
| 3,247,455 | 4/1966 | Benson | 324—61 |
| 2,653,298 | 9/1953 | McKinley | 324—65 |

RUDOLPH V. ROLINEC, *Primary Examiner.*

E. E. KUBASIEWICZ, *Assistant Examiner.*